US008527179B2

(12) United States Patent
Tabares et al.

(10) Patent No.: US 8,527,179 B2
(45) Date of Patent: Sep. 3, 2013

(54) METHOD AND DEVICE FOR MEASURING THE EMISSIONS OF ENGINES

(75) Inventors: JoséLuis Miguez Tabares, Vigo (ES); Santiago Murillo Zapatero, Blade (ES); Knut Hoyer, Schwenningen (DE)

(73) Assignee: Testo AG, Lenzkirch (DE)

( * ) Notice: Subject to any disclaimer, the term of this patent is extended or adjusted under 35 U.S.C. 154(b) by 797 days.

(21) Appl. No.: 12/677,070

(22) PCT Filed: Sep. 3, 2008

(86) PCT No.: PCT/EP2008/007189
§ 371 (c)(1), (2), (4) Date: Mar. 8, 2010

(87) PCT Pub. No.: WO2009/033597
PCT Pub. Date: Mar. 19, 2009

(65) Prior Publication Data
US 2011/0016948 A1 Jan. 27, 2011

(30) Foreign Application Priority Data
Sep. 7, 2007 (DE) ........................ 10 2007 042 748

(51) Int. Cl.
*G01M 15/10* (2006.01)
*F01N 9/00* (2006.01)
*G01N 19/10* (2006.01)

(52) U.S. Cl.
USPC .......................................... 701/101; 73/29.02

(58) Field of Classification Search
USPC .................. 701/101, 102, 108, 109; 60/274, 60/277, 278, 285, 295, 301, 303; 73/23.1, 73/29.02
See application file for complete search history.

(56) References Cited

U.S. PATENT DOCUMENTS 6,968,677 B2 * 11/2005 Tamura .......................... 60/277
7,628,009 B2 * 12/2009 Hu et al. ......................... 60/285
8,091,345 B2 * 1/2012 Farrell et al. .................... 60/274
2003/0042151 A1 3/2003 Ando et al.
2007/0079603 A1 4/2007 Hu et al.

FOREIGN PATENT DOCUMENTS

DE 10216260 A1 11/2003
DE 10216278 A1 11/2003
EP 0 911 511 A2 4/1999
WO 03/062633 A1 7/2003

* cited by examiner

*Primary Examiner* — Hieu T Vo
(74) *Attorney, Agent, or Firm* — Hoffmann & Baron, LLP

(57) ABSTRACT

The invention relates to a method and a device for determining specific emissions as an exhaust gas characteristic of an internal combustion engine. Said method is characterized in that the exhaust gas mass flow (3) is determined as the first operating parameter and the engine power output (2) as the second operating parameter, the nitrous oxide mass flow (3) and the engine power output (2) are derived from a respective measured value that deviates from the operating parameter and the exhaust gas characteristic is calculated as a quotient from the corrected exhaust gas mass flow (3) and the engine power output (2).

40 Claims, 6 Drawing Sheets

$$GAS_{NOx} = \frac{\sum_{i=1}^{i=n} GNOX_i \cdot W_{Fi}}{\sum_{i=1}^{i=n} P_i \cdot W_{Fi}}$$

Power determination ($P_i$)

NOx Mass Flow Determination (GNOXi)

NOx Mass Flow Determination (GNOXi)

METHOD AND DEVICE FOR MEASURING THE EMISSIONS OF ENGINES

The invention pertains to a method and a device for determining specific nitrogen oxide emissions of an internal combustion engine.

In the course of the ongoing climate debate, climate protection rules and regulations that specify limits on exhaust gas emissions for individual means of transportation have been established in many areas of passenger and freight traffic. These limits are usually related to a certain value such as, e.g., km, kWh or the like.

Such limits are also increasingly being imposed on rail vehicles, as well as on waterborne traffic. For the maritime transport sector, for example, the Marpol Convention stipulates in Annex VI that the exhaust emissions of a ship be set in relation to the engine power, i.e., in the form of, e.g., grams of pollutant per kilowatt of power and operating hour. Currently, the emissions of sulfur oxides ($SO_x$) and nitrogen oxides ($NO_x$) are regulated.

Other sectors such as, e.g., stationary engines for various applications are subject to similar regulations or comparable directives and limits are currently being prepared.

Compliance with limits is usually verified while the engines are mounted on corresponding test stands during type approvals, design tests, etc. On these test stands, the complete measuring technology is available in the form of stationary measuring devices because the test stand is, after all, specifically designed for verifying the corresponding limits, parameters, factors, etc. Since there is an increasing number of instances in which it is necessary or required to verify compliance with limits in the field, i.e., during the actual operation of engines, e.g., in a locomotive or on a ship, there is a need for reliable and mobile measuring systems that make it possible to quickly and easily verify on-site whether the internal combustion engines are in compliance with the respective limits. However, it is frequently difficult or impossible to also carry out a direct on-site measurement of all operating parameters for determining the emission values that are measured on a test stand. For example, it is frequently impossible to determine the instantaneous power output or the current fuel consumption without complicated alterations or modifications of the machine itself.

The invention therefore is based on the objective of developing a method and a device for easily determining specific exhaust gas performance figures of an internal combustion engine in real time and under realistic conditions.

According to the invention, this objective is attained in that the emission mass flow or a specific exhaust gas component mass flow is determined as a first operating parameter and the engine power output is determined as a second operating parameter, in that the specific exhaust gas component mass flow and the engine power output are respectively derived or determined from at least one measured quantity that deviates from the operating parameter, and in that the specific emission (exhaust gas performance figures) is calculated as the quotient of the specific exhaust gas component mass flow and the engine power output. A measured quantity that deviates from an operating parameter refers, in particular, to a measured quantity that physically differs from the operating parameter. The exhaust gas component preferably consists of $NO_x$. However, the method can also be used for other exhaust gas components such as, for example, $SO_x$.

Since the operating parameters are derived from measured quantities that can be acquired more easily, it is possible to utilize a method and a measuring system that do not require complicated and costly alterations. Consequently, such a method can be used on different engines at any location and allows a reliable real-time control of the exhaust gas performance figures and/or exhaust gas limits.

It is practical to determine the two operating parameters for different load conditions of the engine. If applicable, a summation of the operating parameters is also carried out.

It is particularly practical that the operating parameters belonging to a certain load stage are multiplied with weighting factors that are adapted to the intended use of the engine prior to the summation, wherein the weighting factors may be stored, for example, in a table. In this case, it is possible, in particular, to take the individual load stages into consideration to a different degree in the performance figures. For example, a marine diesel engine primarily runs slightly below full load such that the weighting factor may be higher in this case than at idle speed while an automobile is primarily operated at partial load or lower and the pollutant emission therefore can or must be weighted higher in this load range.

The specific exhaust gas performance figures is preferably defined as the corrected specific exhaust gas component mass flow per kilowatt of engine power and per operating hour and simply referred to as the specific emission performance figures below.

In a first embodiment of the invention, the engine power is determined from the current torque and the engine speed, wherein the torque is determined, for example, by means of a strain gauge on the shaft.

According to a second embodiment of the inventive emission performance figures determination, the engine power is calculated from the fuel mass flow and the specific fuel consumption of the engine, wherein the specific fuel consumption is a value that is provided by the manufacturer and indicates, e.g., in the form of a table or diagram, the corresponding fuel consumption at the respective engine power. Due to the determination of the instantaneous fuel consumption, the power can be, e.g., simply read out in the table or interpolated based on the table values.

It may occasionally be difficult or impossible to arrange a fuel mass flow sensor on or in the supply lines of the engine, which is why it may be sensible to calculate the fuel mass flow from the exhaust gas mass flow and the stoichiometric air requirement. A simple observation of the reaction equation makes it possible to recalculate the fuel mass flow from the exhaust gas quantity.

In this case, the stoichiometric air requirement results from the chemical composition of the fuel, particularly the mass fractions of carbon, hydrogen and, if applicable, sulfur.

Since it may also be difficult to measure the exhaust gas mass flow, the fuel mass flow can be recalculated from the combustion air mass flow and the excess air factor. In this case, the excess air factor takes into consideration that not all of the air (oxygen) is required for the combustion and therefore cannot be included in the fuel calculation.

The excess air factor is determined from the composition of the exhaust gas in this case, particularly the volume concentration of carbon dioxide $CO_2$ and, if applicable, CO, as well as, if applicable, hydrocarbons HC. The measuring expenditure can also be reduced in this case by calculating the carbon dioxide fraction from the oxygen volume concentration.

The combustion air mass flow can be measured with a hydrometric vane or a similar measuring device. However, it can also be calculated if the air intake of the engine cannot be accessed.

For this purpose, the speed, the volumetric displacement and the number of cylinders of the engine, the charge air pressure and the charge air temperature downstream of the intercooler, i.e., prior to the admission into the engine, the ambient temperature, the air pressure and the relative humidity are determined and the combustion air mass flow is calculated therefrom.

When using an engine without an intercooler or turbocharger, the corresponding measured values are processed analogously, wherein the intake air replaces the charge air in this case and the intake air temperature and the normal ambient pressure are used instead of the charge air temperature and the charge air pressure.

Several options are available for determining the power depending on which types of sensors are available and which locations of the engine are accessible. In the worst-case scenario, it may suffice to carry out a simple oxygen measurement in the exhaust gas by inserting a thin probe through a small opening in the exhaust gas system, as well as to determine the charge air pressure and charge air temperature together with the ambient parameters and the engine speed. All other data can then be calculated from these measured values, the fuel parameters and the known engine data.

The determination of the exhaust gas component mass flow, particularly the nitrogen oxide mass flow, can be realized similarly. A direct determination of the mass flow also may be occasionally difficult in this case because it is problematic to carry out the volume flow rate measurement required for this purpose in larger exhaust gas stacks such as, e.g., on ships.

Consequently, it is necessary to determine the volume concentration, e.g., of nitrogen oxides, by means of a gas sensor and to calculate the mass flow therefrom. Some commercially available $NO_x$ sensors determine the concentration in dry exhaust gas such that the measuring result is processed with a dry-humid correction factor for further use.

Corresponding measuring methods and sensors generally also make it possible to directly carry out a measurement of the $O_2$, $NO_x$, $SO_x$ and/or HC concentration on humid exhaust gas. A recalculation into a humid mass flow is no longer required in this case.

This dry-humid correction factor is defined by the volume concentration of CO and $CO_2$, as well as by the ambient conditions such as the absolute air pressure, the relative humidity and the temperature.

The $NO_x$ concentration in humid exhaust gas formed in this way is recalculated into an $NO_x$ mass flow together with the humid exhaust gas mass flow, wherein the exhaust gas mass flow was already measured or determined during the power determination and therefore is already available in the form of a value or can be determined in accordance with the same method.

Depending on the application and the specifications, the resulting value of the $NO_x$ mass flow is now processed with a special $NO_x$ weighting factor in order to obtain a value that is comparable, for example, to test stand values of the engine. This weighting factor is determined from the air temperature and the air pressure of the intercooler, as well as the ambient conditions such as the absolute air pressure, the relative humidity and the temperature.

Consequently, this method is universally applicable and can be easily carried out, especially in the field. Particularly on a vehicle that is in operation such as, for example, a ship, this makes it possible to realize the measurement of the exhaust gas parameters in the exhaust gas with a simple probe in the vicinity of the engine rather than having to carry out complicated exhaust gas mass flow measurements in the exhaust gas stack. The probe preferably features a flange or the like such that it can be mounted on the stack or the exhaust gas outlet and protrudes into the engine exhaust gases in the mounted position in order to take an exhaust gas sample.

The exhaust gas sample is preferably taken with a heated or unheated hose, wherein certain precautions, for example, as described in DE 196 31 002 C2, need to be taken when using an unheated hose in order to prevent a transition of the exhaust gas component into exhaust gas moisture.

The real-time determination of the exhaust gas parameters and the exhaust gas performance figures furthermore allows an optimization of the combustion process in the engine because it is possible to observe directly and under realistic operating conditions how changes of the input parameters and engine adjustments affect the exhaust gas concentration and ultimately also influence the fuel consumption.

According to one embodiment of the invention, the humid exhaust gas may be abruptly cooled before it comes in contact with the sensors. This can be realized, for example, in a cooling trap or in a gas cooler that is arranged in the flow of the extracted exhaust gas upstream of the sensors. In this case, it is advantageous that the analyzed exhaust gas components are not bound in the humid exhaust gas.

In order to easily take the exhaust gas sample for the described method, a device for carrying out the method may be provided with a probe for extracting exhaust gas that features a flange for being mounted on the exhaust gas outlet of the internal combustion engine. Consequently, this probe can be quickly and nondestructively mounted in the exhaust gas flow, for example, in the exhaust gas stack of a ship over an extended period of time and/or without any effort on the part of the personnel.

The method is described in greater detail below with reference to the drawings, namely in the form of the exemplary determination of the weighted nitrogen oxide parameter $GAS_{NOx}$ according to directive Marpol 73/78 Annex VI that is simply referred to as Marpol below.

In the drawings:

FIG. 1 shows a device for determining the nitrogen oxide performance figures that can be used, for example, for carrying out measurements aboard a ship.

Figure 1:
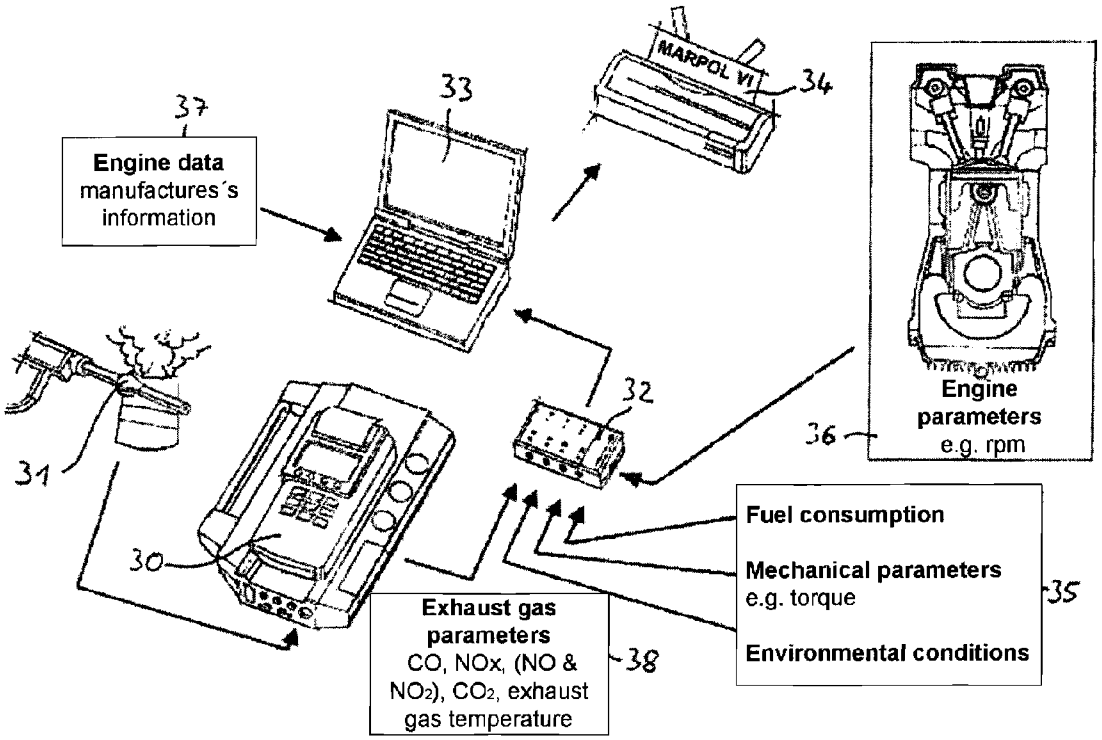
FIG. 1 shows a schematic arrangement for determining the exhaust gas performance figures.

The central component of the system is a measuring device 30 that is connected to an exhaust gas probe 31 via a hose and that is suitable for measuring the exhaust gas volume concentrations of the exhaust gas components $O_2$, CO, $CO_2$, $NO_x$, $SO_2$ and HC, as well as other quantities. For this purpose, the measuring device features a pump that takes in exhaust gas through the probe tip and pumps the exhaust gas through a sensor section in the measuring device. The measuring device has a modular design such that other sensors can be easily inserted into the measuring section in case additional measured values such as, for example, $SO_x$ are required for other or future applications.

It furthermore contains corresponding devices for processing the gaseous analyte such as, e.g., filters, a gas drying module, for example, with a gas cooler, etc. If so required, the exhaust gas probe 31 and its hose may feature filters as well (e.g., also on the probe tip) and are designed in such a way that the gas components to be measured are prevented from binding on the surfaces, etc.

In another exemplary embodiment, a combination of the probe 30 and the measuring device 31 used as an analyzer is realized in the form of one unit, i.e., without an intermediate hose, and arranged directly on the exhaust gas duct.

The measured exhaust gas values 38 are forwarded to a central measured value acquisition device 32.

The device furthermore features measuring devices for ambient parameters 35 and engine parameters 36 that are transmitted to the central measured value acquisition device 32 via radio or cables. These parameters can also be read in, e.g., at an engine management interface.

The measurement data in the central measured value acquisition device 32 can be retrieved by at least one computer 33, on which a suitable program for carrying out the calculation of the performance figures is loaded. If applicable, table data 37 of the engine and fuel manufacturers is also available to the program for the calculation. A corresponding measurement log 34 may be directly output as a result of the calculation. It is also possible to permanently monitor the measurement data with the computer 33 such that a current value of the exhaust gas performance figures can be calculated and displayed at any time. It would also be conceivable to arrange the display directly at the control station or even on the bridge of a ship such that the on-board engineer or the captain can monitor the exhaust gas emissions of the engine at any time. This may make it possible to detect malfunctions of the engine in a timely fashion and to prevent more significant damages.

Figure 2:
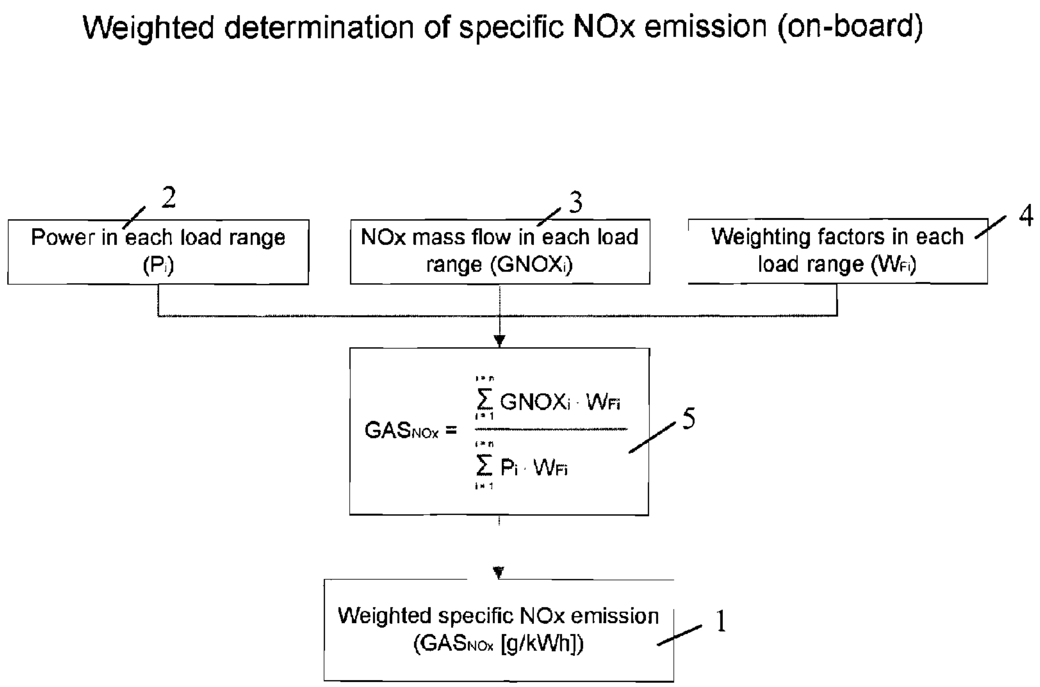
FIG. 2 shows a flow chart for determining the weighted nitrogen oxide performance figures.

FIG. 2 shows a flow chart of the method for determining the weighted nitrogen oxide parameter $GAS_{NOx}$ 1 that describes the nitrogen oxide mass emission in the exhaust gas per kilowatt of power and operating hour. Consequently, the method includes the determination of the power 2 and of the nitrogen oxide mass flow 3. The power 2 and the nitrogen oxide mass flow 3 are determined at different load stages of the engine and the values are weighted with a weighting factor 4. The nitrogen oxide parameter is calculated in accordance with the formula shown in Step 5:

$$GAS_{NOX} = \frac{\sum_{i=1}^{n} GNOX_i \cdot W_{Fi}}{\sum_{i=1}^{n} P_i \cdot W_{Fi}}$$

The weighting factors 4 take into consideration that an engine is primarily operated in a certain load range depending on the respective application. On ships, this is also dependent on the type of drive. For example, the diesel engine of a diesel-electric drive will always run at full speed such that the voltage being generated has the correct frequency. Consequently, the pollutant emissions of a diesel-electric drive is negligible at slow speeds because the engine is usually not operated in this range. On ships with direct drives, in contrast, the engine speed is reduced when traveling slowly such that the pollutant emissions contribute a portion to the total emissions in this case.

In one application, for example, the emissions can be measured with the described method at 10%, 50% and 100% of the full load of the internal combustion engine and inserted into the formula.

In another application that needs to comply with other regulations such as, for example, the aforementioned diesel-electric drives, the emissions are only measured, for example, at 100% of the full load of the internal combustion engine and no summation according to the above formula is carried out.

In conventional applications, the emissions are measured at three to five load points, but these numbers may also differ depending on the corresponding directives or requirements.

The calculation described in Step 5 can also be used for other specific performance figures and would even be suitable for calculating, for example, the customary motor vehicle performance figure of $CO_2$ emission per kilometer. A weighting of different power stages could also be sensible in this case.

Figure 3:
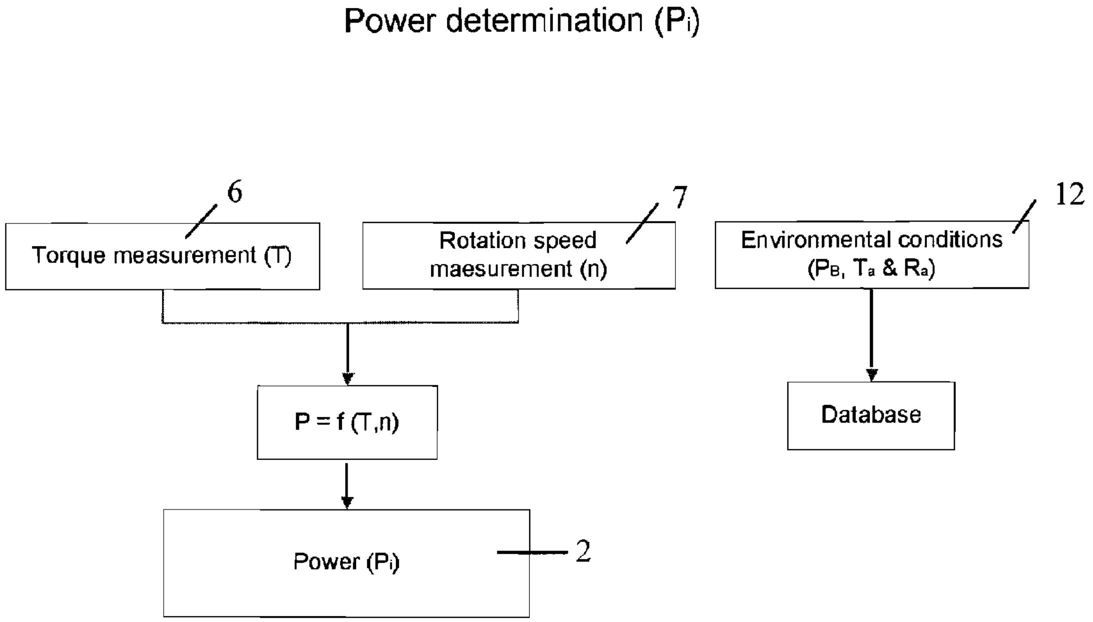
FIG. 3 shows a flow chart of a first method for determining the engine power output.

The power 2 and the nitrogen oxide mass flow 3 can be determined with different methods. A first method for determining the power is illustrated in FIG. 3.

In this case, a torque measurement 6 is carried out on the shaft of the engine in order to determine the power 2. For example, a strain gauge is arranged on the shaft for this purpose and the measured tension is converted into a torque. Along with the speed 7 of the engine, the power 2 can be easily calculated in accordance with the formula $P_i = T \cdot 2\pi \cdot n$, particularly if the shaft parameters are used for converting the measured bridge voltage into the torque.

If the engine drives an electric generator, a determination of the power 2 can be alternatively realized by determining the electric power output of the generator, particularly with consideration of the generator efficiency and/or the transmission ratio of a transmission arranged in the drive train between the engine and the generator.

Figure 4:
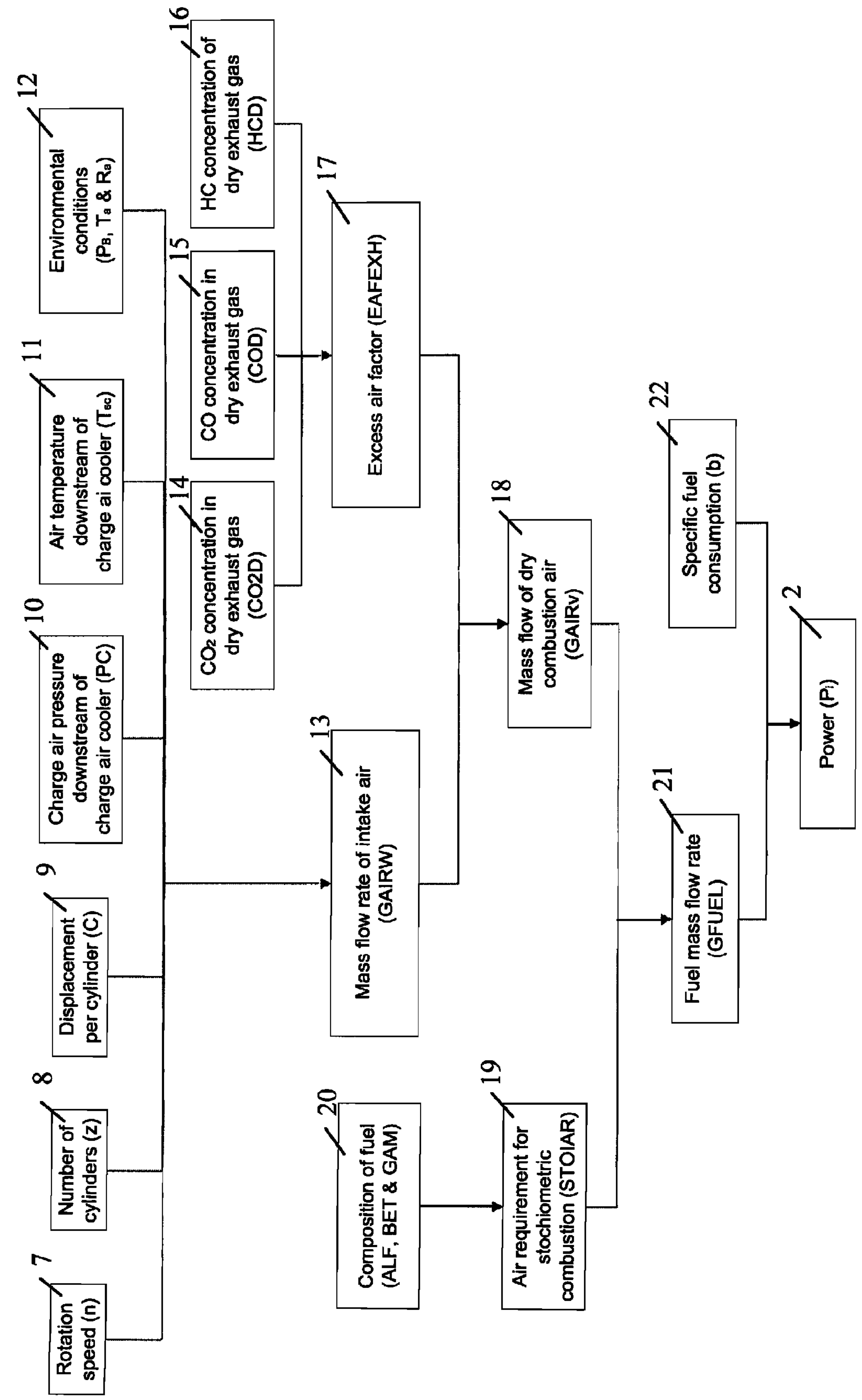
FIG. 4 shows a flow chart of a first method for determining the corrected nitrogen oxide mass flow.

However, if the torque 6 cannot be measured, for example, because the shaft is inaccessible and no strain gauge can be attached, the power determination method described in FIG. 4 does not require a torque measurement and only has simple metrological requirements.

In a first step, the intake air mass flow 13 is calculated from the engine speed 7, the number of cylinders 8, the volumetric displacement 9, the charge air pressure 10 and the charge air temperature 11 downstream of the intercooler, as well as the ambient conditions 12 such as the absolute air pressure, the relative humidity and the temperature.

In a second step that needs to be carried out simultaneously and under identical conditions, the volume concentration of carbon dioxide 14 and, if applicable, carbon monoxide 15, as well as, if applicable, hydrocarbons 16, is measured in the dry exhaust gas. For example, a probe is inserted into the exhaust gas duct of the engine for this purpose such that exhaust gas is drawn into a measuring device by means of said probe and passed over different sensors in this device.

Alternatively, the $CO_2$ volume concentration $CO_2$ can also be calculated from the oxygen concentration $O_{2,\ measured}$ (in %) and the maximum $CO_2$ quantity $CO_{2,\ max}$ that can be produced from the fuel, namely in accordance with the formula $$CO_2 = \frac{CO_{2,max} \cdot (21\% - O_{2,gemessen})}{21\%}$$

An excess air factor 17 that indicates how much of the intake air was not required for the combustion can be calculated from the three values.

A combustion air or exhaust gas mass flow 18 is calculated from the intake air mass flow 13 and the excess air factor 17.

At the same time, the stoichiometric air requirement 19 is calculated from the specific composition of the fuel 20 in another step, wherein the composition is a value provided by the fuel manufacturer. The calculation therefore can also be carried out in advance and the result can be buffered. In this case, the interesting components are the carbon, sulfur and hydrogen fractions in the fuel.

The fuel mass flow 21 can be determined based on the combustion air mass flow 18 and the stoichiometric air requirement 19 by observing the reaction equation and the molar mass balance.

In a last step, the power 2 of the engine is calculated or interpolated from the fuel mass flow 21 with the specific fuel consumption 22 that is provided by the engine manufacturer in table form.

Figure 5:
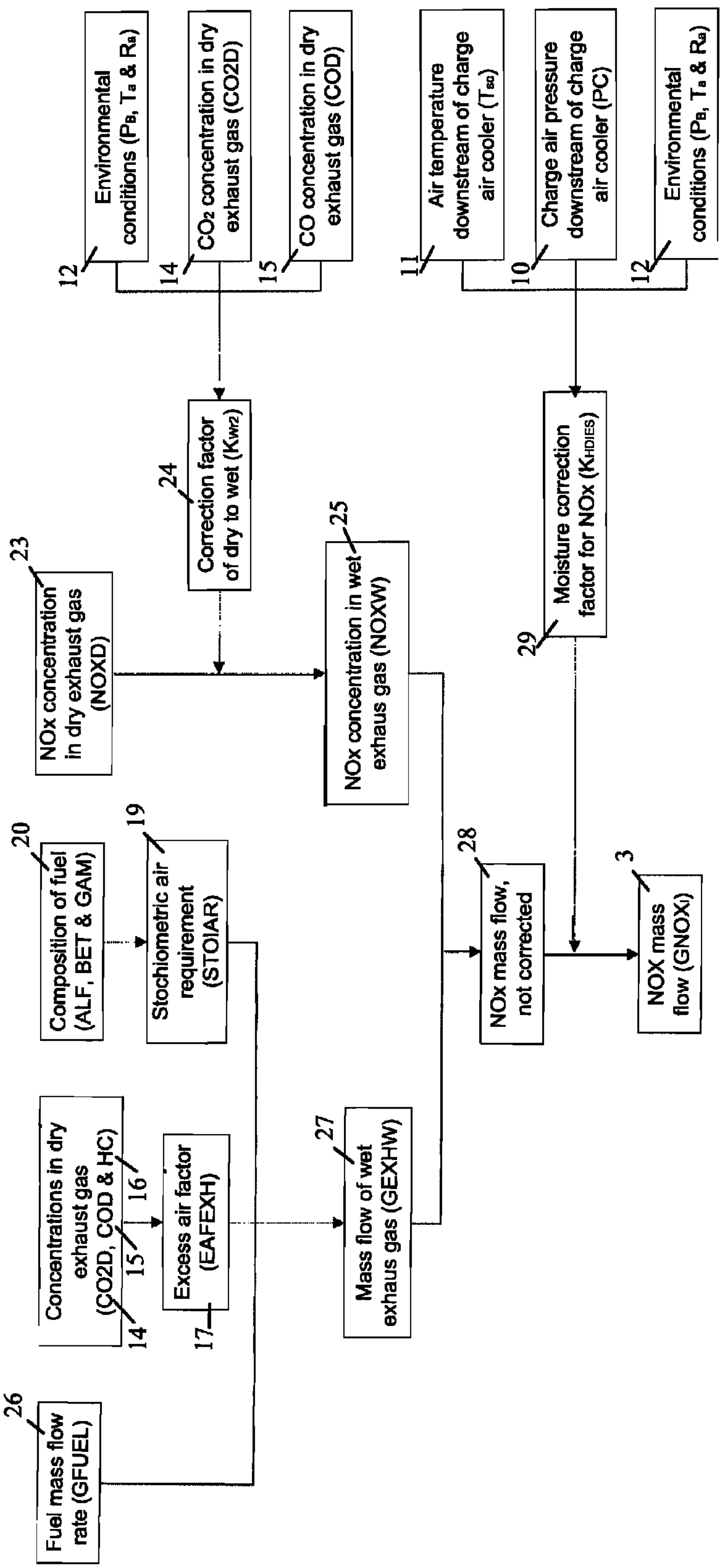
FIG. 5 shows a flow chart of a second method for determining the engine power output.

FIG. 5 shows a first method for determining the nitrogen oxide mass flow GNOX that is required for calculating the nitrogen oxide performance figures in addition to the power. One important part of the method is the determination of the nitrogen oxide volume concentration 23 in the dry exhaust gas. This requires a sensor in the exhaust gas flow, wherein this sensor is advantageously arranged in the same measuring device that is also provided, among other things, for measuring the carbon dioxide 14. In the simplest case, it suffices to install a corresponding sensor module into the gas path of the measuring device for this purpose such that the installation expenditures are very low.

The $NO_x$ concentration needs to be converted into the volume concentration in the humid exhaust gas 25 for additional processing with the aid of a dry-humid correction factor 24 that was calculated from the ambient conditions 12 that were already determined during the power determination and the carbon dioxide concentrations 14, 15.

The fuel mass flow 26 is measured in a parallel step, for example, by installing an impeller flow meter into the fuel supply line or in a non-invasive fashion by means of clamp-on sensors. The humid exhaust gas mass flow 27 is calculated from the fuel mass flow 26, as well as the excess air factor 17 and the stoichiometric air requirement 19 that were already calculated during the power determination.

The humid $NO_x$ mass flow 28 in the exhaust gas is calculated from the humid exhaust gas mass flow 27 and the $NO_x$ concentration 25 in a next step.

However, since the nitrogen oxide performance figures cannot be affected by ambient influences such as the humidity, an $NO_x$ humidity correction factor needs to be calculated in another step from the ambient conditions 12 that were already determined during the power determination, as well as the charge air pressure 10 and the charge air temperature 11 downstream of the intercooler, i.e., prior to the admission into the engine.

In a last step, the $NO_x$ mass flow 3 required for determining the nitrogen oxide performance figures is calculated from the humid $NO_x$ mass flow 28 and the $NO_x$ humidity correction factor 29.

Figure 6:
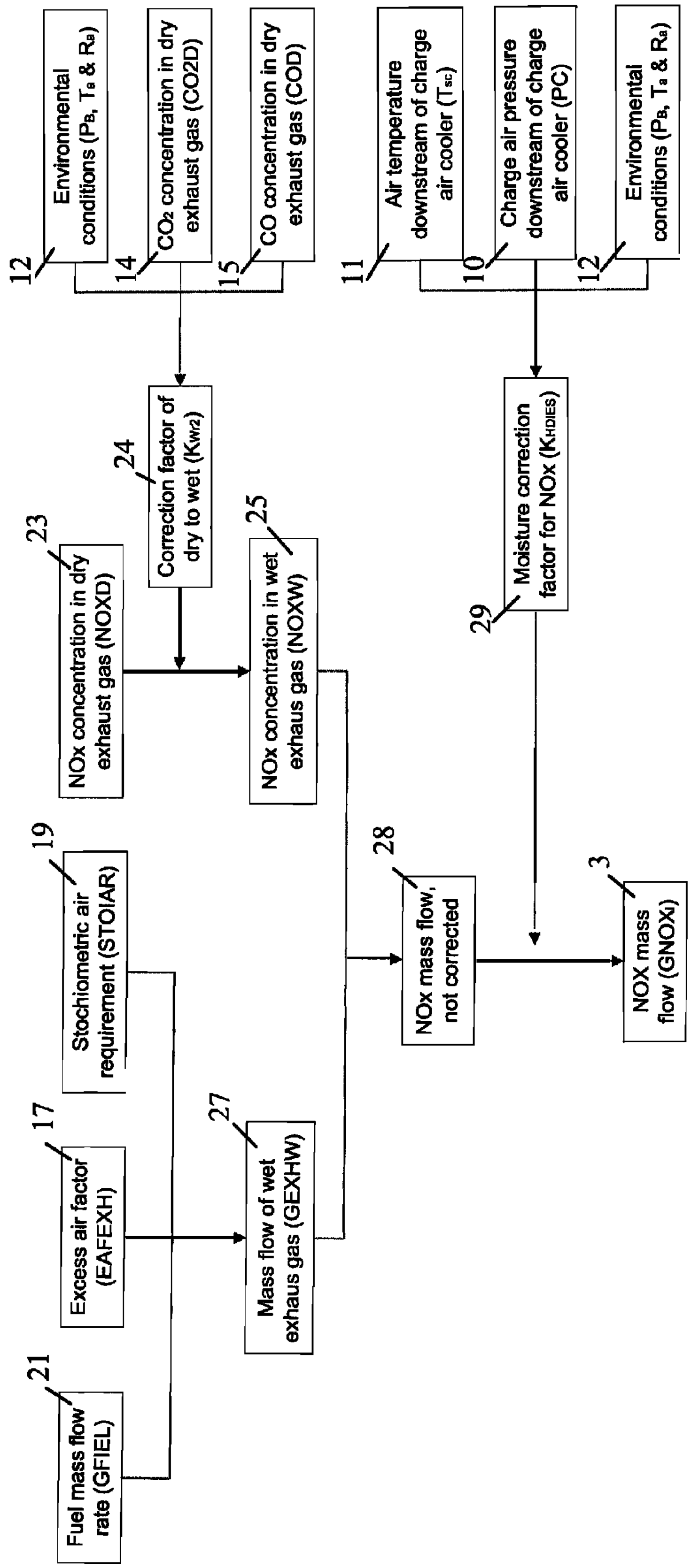
FIG. 6 shows a flow chart of a second method for determining the corrected nitrogen oxide mass flow.

FIG. 6 shows another method for determining the $NO_x$ mass flow 3 that can be distinguished merely from the method according to FIG. 5 with respect to the determination of the fuel mass flow.

In this case, the calculated value from the power determination according to FIG. 4 is used as fuel mass flow 21. This makes it possible to eliminate a measurement of the fuel mass flow and the method can be significantly simplified because it is usually not possible to subsequently or temporarily arrange a mass flow sensor on an engine.

The invention pertains to a method and a device for determining specific emissions as exhaust gas performance figures of an internal combustion engine. The method is characterized in that the emission mass flow that is also referred to as exhaust gas mass flow, particularly the exhaust gas component mass flow 3, in which the exhaust gas component preferably consists of $NO_x$, is determined as a first operating parameter and the engine power output 2 is determined as a second operating parameter, in that the exhaust gas component mass flow 3 and the engine power output 2 are respectively derived from at least one measured quantity that deviates from the operating parameter, and in that the exhaust gas performance figures are calculated as the quotient of the corrected exhaust gas component mass flow 3 and the engine power output 2.

A method and a device are provided for determining specific emissions as an exhaust gas characteristic of an internal combustion engine. The method is characterized in that the exhaust gas mass flow (3) is determined as the first operating parameter and the engine power output (2) as the second operating parameter, the nitrous oxide mass flow (3) and the engine power output (2) are derived from a respective measured value that deviates from the operating parameter and the exhaust gas characteristic is calculated as a quotient from the corrected exhaust gas mass flow (3) and the engine power output (2).

The invention claimed is:

1. Device for determining specific emissions of an internal combustion engine, characterized by the fact that the device includes:

means (30, 31, 35, 36) for acquiring a first operating parameter and a second operating parameter, wherein said means including means for determining and/or inputting fuel parameters and specific fuel consumption of the internal combustion engine, a measured value acquisition unit (32), and computer (33) that is suitable for calculating the specific emissions from the operating parameters, wherein the first operating parameter is emission mass flow (3) of the internal combustion engine, and the second operating parameter is engine output power (2) of the internal combustion engine, wherein exhaust gas measured values (38) are passed onto the measured value acquisition unit (32), and wherein the engine output power (2) is determined based on fuel mass flow and specific fuel consumption of the internal combustion engine.

2. Device according to claim 1, characterized by the fact that the device features a sensor for determining the oxygen volume concentration in the exhaust gas of the engine.

3. Device according to claim 1, characterized by the fact that the device features a sensor for determining the $CO_2$ volume concentration in the exhaust gas of the engine.

4. Device according to claim 1, characterized by the fact that the device features a sensor for determining the $NO_x$ volume concentration (23) in the exhaust gas of the engine.

5. Device according to claim 1, characterized by the fact that the device features a sensor for determining the CO volume concentration in the exhaust gas of the engine.

6. Device according to claim 1, characterized by the fact that the device features a sensor for determining the hydrocarbon concentration (16) in the exhaust gas of the engine.

7. Device according to claim 1, characterized by the fact that the device features a sensor for determining the $SO_2$ volume concentration in the exhaust gas of the engine.

8. Device according to claim 1, characterized by the fact that the device features a sensor for determining or means for inputting the rotational speed (7) of the shaft.

9. Device according to claim 1, characterized by the fact that the device features sensors for determining or means for inputting the charge air temperature (11) and the charge air pressure (10), particularly at the intercooler.

10. Device according to claim 1, characterized by the fact that the device features sensors for determining or means for inputting the ambient temperature ($T_a$), the absolute air pressure ($p_B$) and the relative humidity ($R_a$).

11. Device according to claim 1, characterized by the fact that a probe is provided for withdrawing exhaust gas and features a flange for being mounted on the exhaust gas outlet of the internal combustion engine.

12. Device according to claim 1, characterized by the fact that the sensors feature a radio link with the measured value acquisition device (32) in order to transmit the measuring data.

13. Device according to claim 1, characterized by the fact that an interface with the engine management and/or process control system of the internal combustion engine is provided.

14. Device according to claim 1, characterized by the fact that the sensors are arranged in a measuring device (30) and that an exhaust gas probe (31) is provided for withdrawing the exhaust gas, wherein the measuring device (30) and the exhaust gas probe (31) are realized, in particular, in the form of one unit.

15. Device according to claim 1, characterized by the fact that a heated or unheated hose is provided for taking the exhaust gas sample.

16. Method for determining specific emissions of an internal combustion engine, characterized by, determining emission mass flow (3) of the internal combustion engine as a first operating parameter;

determining engine power output (2), based on fuel mass flow (21, 26) and specific fuel consumption (22), of the internal combustion engine as a second operating parameter, wherein, said first and second operating parameters are each determined based on at least one measurement variable which is physically different from respective said operating parameter; and calculating a specific emission as the quotient of the emission mass flow corrected by a moisture correction factor for $NO_x$ (29) and the engine output power (2).

17. Method according to claim 16, characterized by the fact that the exhaust gas component mass flow (3) of a component in the exhaust gas of the internal combustion engine is determined during the determination of the emission mass flow.

18. Method according to claim 17, characterized by the fact that the exhaust gas component is $NO_x$.

19. Method according to claim 16, characterized by the fact that the determination of the first and the second operating parameters is repeated for different load conditions of the engine and the specific emission (1) is formed as the quotient of the sums of the operating parameters.

20. Method according to claim 19, characterized by the fact that the operating parameters of the different load conditions are respectively multiplied with a weighting factor (4) during the summation and the weighting factors (4) are adapted to the intended use of the internal combustion engine.

21. Method according to claim 20, characterized by the fact that the weighting factors (4) are stored in a table.

22. Method according to claim 16, characterized by the fact that the procedural step for determining the engine power output (2) includes the following additional steps:

determination of the current torque (6) of the engine, determination of the current speed (7) of the engine.

23. Method according to claim 16, characterized by the fact that the procedural step for determining the engine power output (2) includes the following additional step:

determination of the electric power output of a generator driven by the engine.

24. Method according to claim 16, characterized by the fact that the procedural step for determining the exhaust gas component mass flow (3) in the exhaust gas includes the following additional procedural step:

determination of the humid exhaust gas component mass flow in the exhaust gas (28).

25. Method according to claim 24, characterized by the fact that the procedural step for determining the humid exhaust gas component mass flow (28) in the exhaust gas includes the following additional procedural steps:

determination of the humid emission mass flow (27), determination of the exhaust gas component concentration (25) in the humid exhaust gas.

26. Method according to claim 25, characterized by the fact that the procedural step for determining the humid exhaust gas mass flow (27) includes the following additional procedural steps:

determination of the fuel mass flow (26), determination of the excess air factor (17), determination of the stoichiometric air requirement (19).

27. Method according to claim 26, characterized by the fact that the procedural step for determining the stoichiometric air requirement (19) includes the following additional procedural step:

determination or input of the fuel composition (20), particularly the mass fractions of hydrogen, carbon and, if applicable, sulfur (ALF, BET, GAM).

28. Method according to claim 26, characterized by the fact that the procedural step for determining the excess air factor (17) includes at least the following additional procedural step:

determination of the $CO_2$ volume concentration (14) in the dry exhaust gas.

29. Method according to claim 26, characterized by the fact that the procedural step for determining the excess air factor (17) includes at least the following additional procedural step:

determination of the CO volume concentration (15) in the dry exhaust gas.

30. Method according to claim 26, characterized by the fact that the procedural step for determining the excess air factor (17) includes at least the following additional procedural step:

determination of the hydrocarbon concentration (16) in the dry exhaust gas.

31. Method according to claim 24, characterized by the fact that the procedural step for determining the exhaust gas component concentration (25) in the humid exhaust gas includes the following additional procedural steps:

determination of the exhaust gas component concentration in the dry exhaust gas (23), determination of the dry-humid correction factor (24).

32. Method according to claim 31, characterized by the fact that the procedural step for determining the dry-humid correction factor (24) includes the following additional procedural steps:

determination of the $CO_2$ concentration in the dry exhaust gas (14), determination of the ambient conditions (12), particularly at least the air pressure ($p_B$), the temperature ($T_a$) and the relative humidity ($R_a$).

33. Method according to claim 31, characterized by the fact that the procedural step for determining the $CO_2$ volume concentration (14) includes the following additional procedural step:

determination of the oxygen concentration $O_2$ in the exhaust gas, particularly for calculating the $CO_2$ volume concentration from the maximum $CO_2$ quantity $CO_{2,max}$ that can be produced from the fuel.

34. Method according to claim 31, characterized by the fact that the procedural step for determining the dry-humid correction factor (24) includes the following additional procedural step:

determination of the CO concentration in the dry exhaust gas (15).

35. Method according to claim 16, characterized by the fact that the procedural step for determining the exhaust gas component mass flow (3) in the exhaust gas includes the following additional procedural steps:

determination of a humidity correction factor (29).

36. Method according to claim 35, characterized by the fact that the procedural step for determining the humidity correction factor (29) includes the following additional procedural steps:

determination of the charge air pressure prior to the admission into the engine (10), determination of the charge air temperature prior to the admission into the engine (11), determination of the ambient conditions (12) characterized by at least the absolute air pressure ($p_B$), the temperature ($T_a$) and the relative humidity ($R_a$).

37. Method according to claim 16, characterized by the fact that the procedural step for determining the fuel mass flow (21, 26) includes the following additional procedural steps:

determination of the stoichiometric air requirement (19), determination of the dry air mass flow into the internal combustion engine (18).

38. Method according to claim 37, characterized by the fact that the procedural step for determining the dry air mass flow (18) into the internal combustion engine includes the following additional procedural steps:

determination of the intake air mass flow (13), determination of the excess air factor (17).

39. Method according to claim 38, characterized by the fact that the procedural step for determining the intake air mass flow (13) includes the following additional procedural steps:

determination of the engine speed (7), determination of the number of cylinders (8) of the engine, determination of the volumetric displacement (9), determination of the charge air pressure prior to the admission into the engine (10), determination of the charge air temperature prior to the admission into the engine (11), determination of the ambient conditions (12), particularly the absolute air pressure ($p_B$), the temperature ($T_a$) and the relative humidity ($R_a$).

40. Method according to claim 16, characterized by the fact that the humid exhaust gas is abruptly cooled before it comes in contact with the sensors.

* * * * *